United States Patent [19]

Cheong et al.

[11] Patent Number: 5,897,651
[45] Date of Patent: *Apr. 27, 1999

[54] INFORMATION HANDLING SYSTEM INCLUDING A DIRECT ACCESS SET ASSOCIATIVE CACHE AND METHOD FOR ACCESSING SAME

[75] Inventors: Hoichi Cheong; Kimming So, both of Austin, Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/556,526

[22] Filed: Nov. 13, 1995

[51] Int. Cl.$^6$ ....................................................... G06F 12/08
[52] U.S. Cl. .............................. 711/3; 711/128; 711/136; 711/122
[58] Field of Search ..................................... 395/455, 449, 395/463, 403; 711/128, 122, 136, 3

[56] References Cited

U.S. PATENT DOCUMENTS

| | | | |
|---|---|---|---|
| 4,464,712 | 8/1984 | Fletcher | 711/122 |
| 4,737,909 | 4/1988 | Harada | 711/3 |
| 4,785,398 | 11/1988 | Joyce et al. | 711/3 |
| 4,811,203 | 3/1989 | Hamstra | 711/142 |
| 4,905,139 | 2/1990 | Asai et al. | 711/136 |
| 4,905,141 | 2/1990 | Brenza | 711/129 |
| 4,905,188 | 2/1990 | Chuang et al. | 711/128 |
| 5,133,061 | 7/1992 | Melton et al. | 711/128 |
| 5,235,697 | 8/1993 | Steely, Jr. et al. | 711/137 |
| 5,325,511 | 6/1994 | Collins et al. | 711/128 |
| 5,353,424 | 10/1994 | Partovi et al. | 711/128 |
| 5,392,414 | 2/1995 | Yung | 711/128 |
| 5,564,035 | 10/1996 | Lai | 711/122 |

FOREIGN PATENT DOCUMENTS

| | | |
|---|---|---|
| 0549 321 A2 | 6/1993 | European Pat. Off. . |
| 6467653 | 3/1989 | Japan . |
| 6468855 | 3/1989 | Japan . |
| 1173242 | 7/1989 | Japan . |
| 5046668 | 2/1993 | Japan . |
| 5120135 | 5/1993 | Japan . |
| 6110787 | 4/1994 | Japan . |
| 6161896 | 6/1994 | Japan . |
| 2 214 669 | 12/1991 | United Kingdom . |
| 2 276 962 | 10/1994 | United Kingdom . |

OTHER PUBLICATIONS

"Cache Sampling By Sets," Liu, L. and Peir, J.-K., *IEEE Transactions on Very Large Scale Integration (VLSI) Systems* (USA), vol. 1, No. 2, Jun. 1993, pp. 98–105.

"Eliminating the Address Translation Bottleneck for Physical Address Cache," Chiueh, T. and Katz, r. H., SIGPLAN Not. (USA), Fifthe International Conference on Architectural Support for Programming Languages and Operating Systems (ASPLOS–V), Boston, MA, USA, Oct. 1992, pp. 137–148.

(List continued on next page.)

*Primary Examiner*—Reginald G. Bragdon
*Attorney, Agent, or Firm*—Anthony V.S. England; Philip T. Virga; Andrew J. Dillion

[57] ABSTRACT

An information handling system includes a cache memory architecture which includes a means for performing a direct lookup by identifying the double word in the cache using the congruence class ID field, a set ID field and a double word ID field of the request address, and sending the double word to the CPU, and if the tag of the identified double word does not match the tag of the request address, sending a cancel signal to the CPU, and the double word with a matched tag in the congruence class, and if no match occurs, reloading the line 11 into the improved cache from a lower level cache or from main memory. The line in the set identified by the set ID field replaces the least recently used line in the congruence class and its place is taken by the missing line.

2 Claims, 6 Drawing Sheets

OTHER PUBLICATIONS

"Inexpensive Implementations of Set–Associativity," Kessler, R. E., et al., Proceedings, The 16th Annual International Symposium on Computer Soc. Architecture, IEEE Comput. Press (Washington, D.C.), 1989, pp. 131–139.

"Cache Operations by MRU Change," So, K. and Rechtschaffen, R. N., *IEEE Transactions on Computers* (USA), vol. 37, No. 6, Jun. 1988, pp. 700–709.

"A Quantitative Evaluation of Cache Types," Wu, C. E., et al., Proceedings of the Twenty–Sixth Hawaii International Conference on System Sciences, IEEE 4 vol. (xvi+895+xiv+691+xii+654+xv–+889), vol. 1, 1993, pp. 476–485.

"A Quantitative Evaluation of Cache Types for High–Perfomance Computer Systems," Wu, C.E., et al, *IEEE Transactions on Computers* (USA), vol. 42, No. 10, Oct. 1993, pp. 1154–1162.

"A Second Level Multiprocessing Cache for the i486™DX and i860 ™XP processors," Golbert, A., et al., Digest of Papers. COMPCON Spring 1992, Thirty–Seventh IEEE Computer Society International Conference, San Francisco, CA, USA, IEEE Comput. Soc. Press, xv+498, 1992, pp. 338–343.

"Fast Vector Quantisation Using Cache Codebook," Marangelli, B., *Electronics Letters* (UK), vol. 28, No. 10, May 7, 1992, pp. 938–939.

"Boundary Scan Design for a Memory Controller," Harrod, P. L and Biggs, J. P., IEE Colloquium on 'Application and Development of the Boundary–Scan Standard' (Digest No. 183) IEE, 1990, pp. 3/1–2.

"Cache Operations by MRU–Change," So, K. and Rechtschaffen, R. N., Proceedings—IEEE International Conference on Computer Design: VLSI in Computers, Oct. 6–9, 1986, Port Chester, NY, IEEE Computer Soc. Press, Washington, DC, USA, xvi+607, 1986, pp. 584–586.

"Improving the Bandwdith of a Single Cache Directory and Array," Emma, P., et al., *IBM Technical Disclosure Bulletin,* vol. 36, No. 06A, Jun. 1993, pp. 303–305.

"Arbitrary Congruence Class Assignment," Rechtschaffen, R., *IBM Technical Disclosure Bulletin,* vol. 36, No. 04, Apr. 1993, pp. 369–372.

"Cache Directory Lookup with Partial Address," Liu, L., *IBM Technical Disclosure Bulletin,* vol. 34, No. 7B, Dec. 1991, pp. 395–397.

"Method for Predicting the Performance of Set–Associative Cache Memories," Natarajan, K. S., *IBM Technical Diclosure Bulletin,* vol. 31, No. 8, Jan. 1989, pp. 275–276.

"One–Cycle Cache Design," Chang, J. H., et al, *IBM Technical Disclosure Bulletin,* vol. 31, No. 7, Dec. 1988, pp. 444–447.

"Cache Design of a Sub–Micron CMOS System/370," Proceedings, The 14th Annual Int'l Symp. on Computer Architecture, Jun. 2–5, 1987, Pittsburgh, PA, Computer Society Press, Jun. 1987, pp. 208–213.

"Memory Cache for Prefetching," *Research Disclosure,* Kenneth Mason Pub., Ltd. (England), Jan. 1989, No. 297.

"Deferring Castouts in Store–In Caches," *Research Disclosure,* Kenneth Mason Pub., Ltd. (England), Apr. 1988, No. 288.

"Buffer Replacement Management with Locality Detectors," *Research Disclosure,* Kenneth Mason Pub., Ltd. (England), Jan. 1989, No. 297.

FIG. 7
INDIRECT HIT

FIG. 8
CACHE RELOAD

INFORMATION HANDLING SYSTEM INCLUDING A DIRECT ACCESS SET ASSOCIATIVE CACHE AND METHOD FOR ACCESSING SAME

TECHNICAL FIELD OF THE INVENTION

The present invention relates to data processing systems and more particularly to data processing systems having high speed cache memories.

BACKGROUND OF THE INVENTION

Cache memories are small, high-speed memory stores that are frequently included in the central processing unit ("CPU") architectures of data processing systems. A data processing system typically has two caches: a small level one ("L1") cache usually integrated into the CPU design, and a comparatively larger level two ("L2") connected to the CPU via a memory bus. The L2 cache supplements the L1 cache.

The storage unit of a cache is called a line which can hold a consecutive segment of data in the memory. When a CPU uses a piece of data, the cache is searched for the line containing the data. If the line is already in the cache, the piece of data is sent immediately to the CPU, otherwise the whole line will be loaded from the main memory into the cache. By automatically maintaining recently used lines in the cache, an entire memory system of a data processing system can be made to appear as fast as the cache.

An important measure of the performance of a cache memory is the Buffer Hit Ratio ("BHR"): the percentage of memory accesses that are satisfied by the cache without having to access slower main memory. The higher the BHR, the better the cache performance. Cache performance depends on the application code being run. In particular, the better the code exhibits "spatial locality," that is, the more its references are to closely-spaced elements of its address space, the higher a BHR will be achieved.

Since a cache can contain thousands of lines, very often it is logically organized in a two-dimensional storage of rows and columns in order to reduce search time. In such a case, cache accesses are memory mapped. That is, a consecutive segment of data from the memory that makes up a cache line is assigned uniquely to a row and each row has its own independent logic for controlling the line replacement. These rows, which are called congruence classes, allow any cache line to be accessed in a fixed amount of time.

There are two general types of caches: direct mapped and associative. A direct mapped cache has only one location where a cache line may be stored. When a line maps to a location already having cached data, it displaces its predecessor. A direct-mapped cache is the simplest and fastest, but severely limits the number of cache locations where a particular line can reside. Thus, direct mapped cache performance can be severely degraded if frequent thrashing occurs.

An alternative to a direct-mapped cache is a set-associative cache. Set-Associative caches provide two or more locations in the cache where line having a given address may be stored. While such caches decrease the probability of thrashing, they are inherently slower in operation than direct-mapped caches because the cache logic must compare two or more lines to determine a hit.

In use, a direct-mapped cache can easily achieve single cycle latency, but causes more cache misses compared to a set associative cache with the same capacity and line size. A set associative cache, due to the late select caused by the added comparisons, usually requires more than one cycle of latency.

Intermediate schemes have been designed that attempt to improve the select time of set associative caches. Examples include the most recently used ("MRU") lookup scheme discussed in J. H. Chang, H. H. Chao, and K. So, "One-cycle cache design," IBM TDB 12-88, pp. 444–447 and "Cache Design of a Sub-Micron CMOS System/370," Proceedings, The 14. Ann. Int'l Symp. on Computer Architecture, June 1987, pp. 208–213, which are all hereby incorporated by reference. Another similar scheme is the content addressable memory ("CAM") scheme used in the POWERPC 620 11 instruction and data caches. These schemes speed up cache access by adding complicated tables and controls into the cache that attempt to guess the set identifier of every cache access which might hit the cache. However, the added logic necessary to implement these schemes limit the ability of the cache to achieve single cycle latency when the cycle time of the processor is in the range of only a few nanoseconds. In addition, the added logic increases the complexity and cost of the cache.

Therefore, there is a need in the art for a scheme enabling a set-associative cache to achieve a select time on par with a direct mapped cache without unduly increasing the complexity or cost of the cache.

SUMMARY OF THE INVENTION

The present invention implements a set associative cache with a fast access but without the added hardware or complexity of prior art access schemes.

The above and other objects of the present invention are achieved by an improved cache architecture which includes a set of apparatus for directly locating the accessed cache line and sending the accessed words in the accessed line to the processing unit without waiting for any address tag comparison. If the accessed line does not match the address tag as the request address, retrieving the line with a matched address, or reloading the line from a cache L2 memory if no line has a matched address. The set of apparatus for direct access include using a congruence class ID field and a set ID field of the request address to specify the location of the cache line in the improved cache, and also a double word ID field of the request address to select the double word from the cache line. The double word is then delivered to the CPU (in other systems, where the unit between the CPU and cache transfer is different from a double word, address bits corresponding to such a unit will be used instead). The apparatus also includes a cancellation mechanism and normal set associative lookup mechanism as backup cache access mechanisms. In the set associative lookup, the tag of each line in the same congruence class addressed by the congruence class ID is retrieved from the cache and is compared to the tag of the request address. If the tag of the line retrieved by direct lookup does not match that of the request address, a cancellation signal is sent to instruct the CPU to ignore the double word. As the result of the set associative lookup, if a line other than the one retrieved by the direct lookup has a matched tag, the double word from the matched line is sent to the CPU. If no line in the congruence class has a matched tag, the missing line is reloaded into the cache by removing the least recently used line in the congruence class. Whether an access causes a cache hit or not, the requested line is always staying at the set location specified by the set ID of the request address. If the set location vacated by the least recently used line is not the same as the one specified by the set ID, the line residing in the location specified by set ID will be moved to the location that was occupied the least recently used line, and the requested line will be reloaded into the location specified by the set ID.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5, consisting of FIGS. 5A and 5B shows a more detailed view of the CPU-cache interface of FIG. 2;

DETAILED DESCRIPTION OF THE INVENTION

Figure 1:
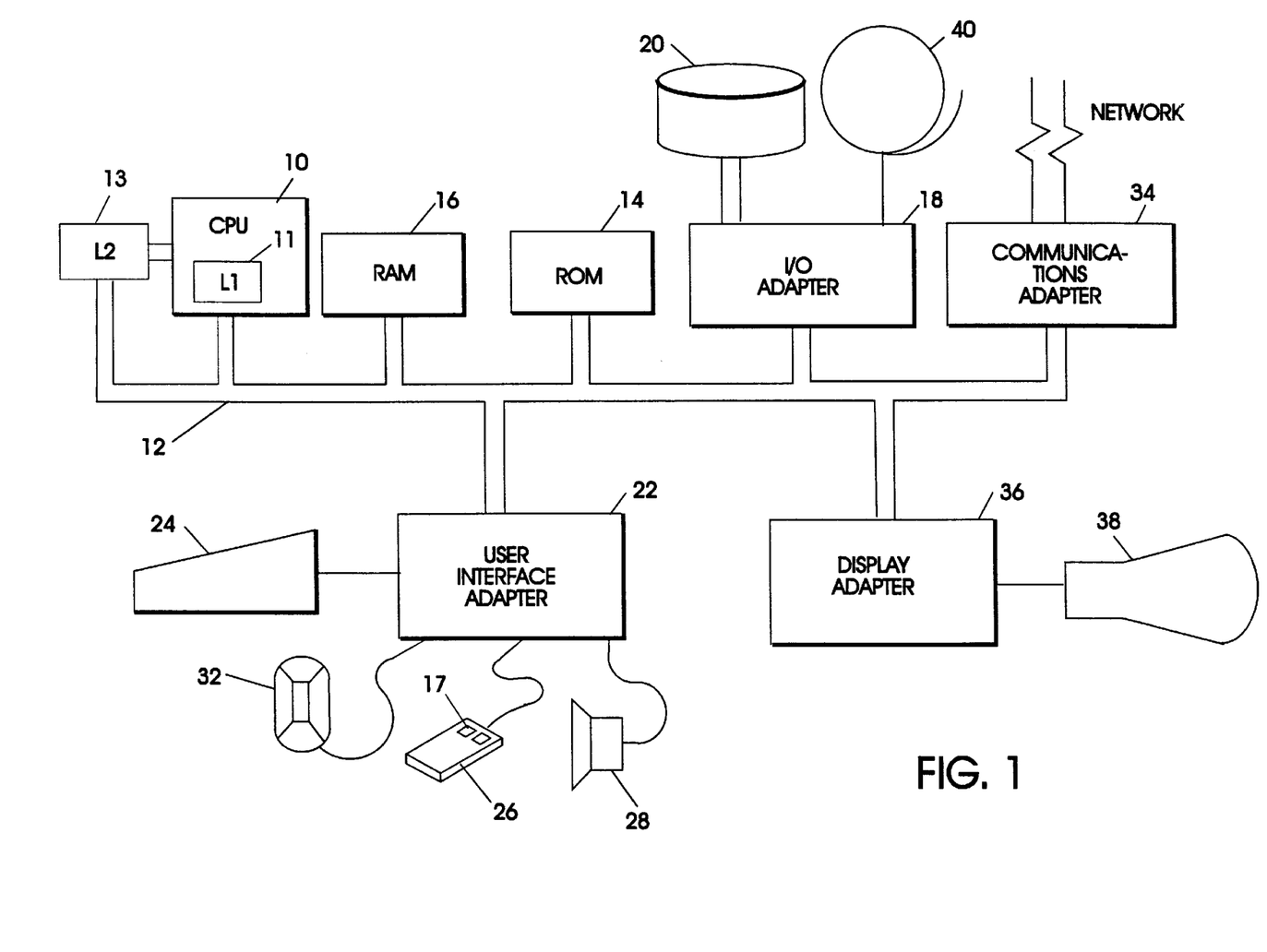
FIG. 1 is a data processing system embodying the present invention.

A representative hardware environment for practicing the present invention is depicted in FIG. 1, which illustrates a typical hardware configuration of a workstation in accordance with the subject invention having at least one central processing unit 10 with an integrated level one ("L1") cache 11, a separate level two ("L2") cache 13 and a number of other units interconnected via system bus 12. The workstation shown in FIG. 1 includes random access memory ("RAM") 16, read only memory ("ROM") 14, and input/output ("I/O") adapter 18 for connecting peripheral devices such as disk units 20 and tape drives 40 to bus 12, user interface adapter 22 for connecting keyboard 24, mouse 26, speaker 28, microphone 32, and/or other user interface devices such as a touch screen device (not shown) to bus 12, communication adapter 34 for connecting the workstation to a data processing network, and display adapter 36 for connecting bus 12 to display device 38.

L1 cache 11 is a direct access set associative cache ("DASA") using the lookup scheme of the present invention. If desired, L2 cache 13 can also be a DASA cache. This document, however, only discusses the present invention with respect to the L1 cache.

Figure 2:
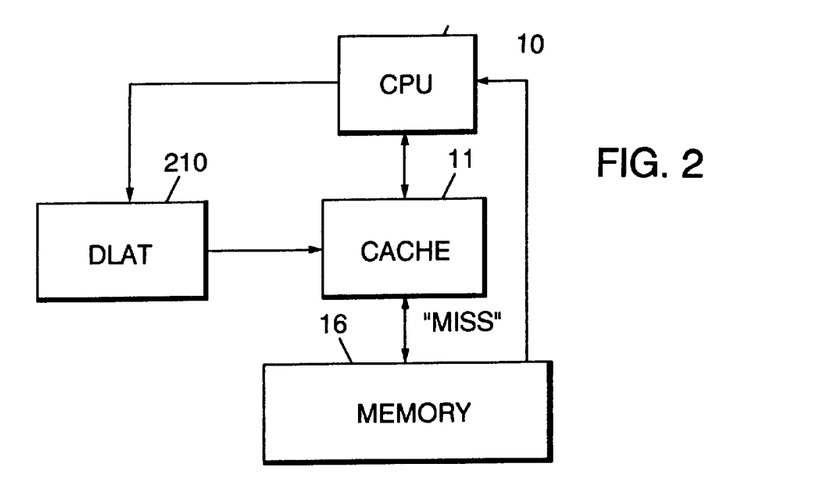
FIG. 2 shows the logical components related to the CPU-cache interface in the data processing system of FIG. 1.

FIG. 2 shows a more detailed view of the interface between CPU 10, L1 cache 11, and RAM 16. Also shown is a dynamic look-aside table ("DLAT") 210. Assuming a virtual memory system for every memory access, CPU 10 presents to RAM 16 a virtual address of the accessed data/storage location. DLAT 210 translates the virtual address into a real address to look up in L1 cache 11 and RAM 16.

In order to facilitate the description of the disclosed embodiment, it is assumed that cache 11 is a 32 Kbyte, 4-way set associative cache with a 64-byte line size, 128 congruency classes ("CCs"). The standard fetch unit of cache 11 is assumed be a double word ("DW") (8 bytes), that is, cache 11 always returns a DW to CPU 10 for every memory request. Note that the field sizes and other cache parameters discussed herein are used only by way of example. In addition, the present invention works equally well in a data processing system using only real addresses.

Figure 3:
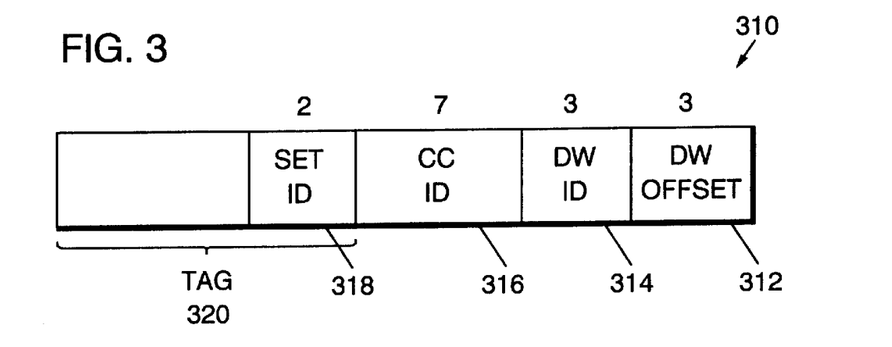
FIG. 3 shows the bit fields within a memory address used by the CPU.

FIG. 3 shows the fields found in a memory address 310 as would be utilized in a data processing system having the parameters described above. Memory address 310 contains a 3-bit DW offset field 312, 3-bit DW ID field 314, 7 bit congruence class ("CC") ID field 316, and set ID field 318 (shown as 2-bit). The rest of the high order bits in memory address 310, along with set ID 318 constitute tag 320. In an embodiment of the present invention, set ID field 318 is the two least significant bits of tag 320. However, set ID 318 can be any bits of the tag 320, as long as set ID 318 is wide enough to specify all sets in the cache. The other fields, including CC ID 316 and DW ID 314 are determined by the memory addressing scheme used by the data processing system.

Figure 4:
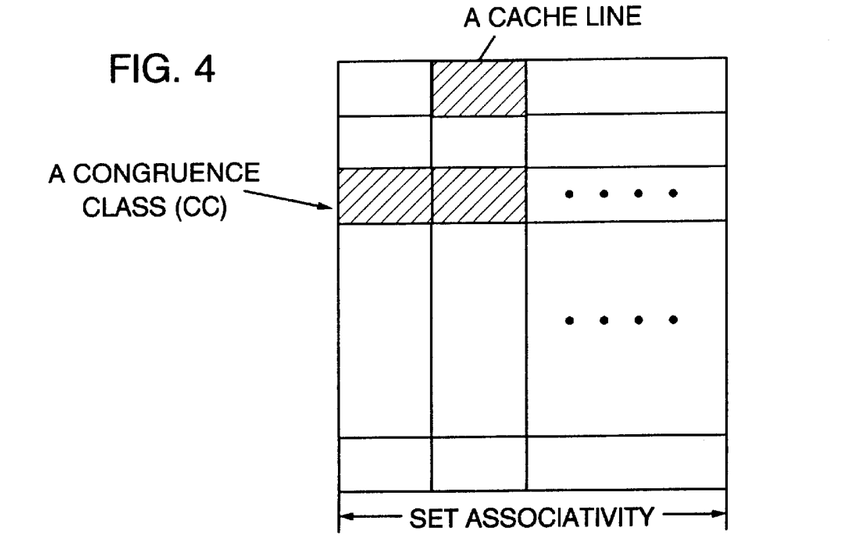
FIG. 4 shows the logical layout of data within a set associative cache.

FIG. 4 shows a diagram of cache 11's logical layout. Each CC is represented as a row in cache 11. Each CC row contains four lines of data organized into sets.

Figures 5, 5B:
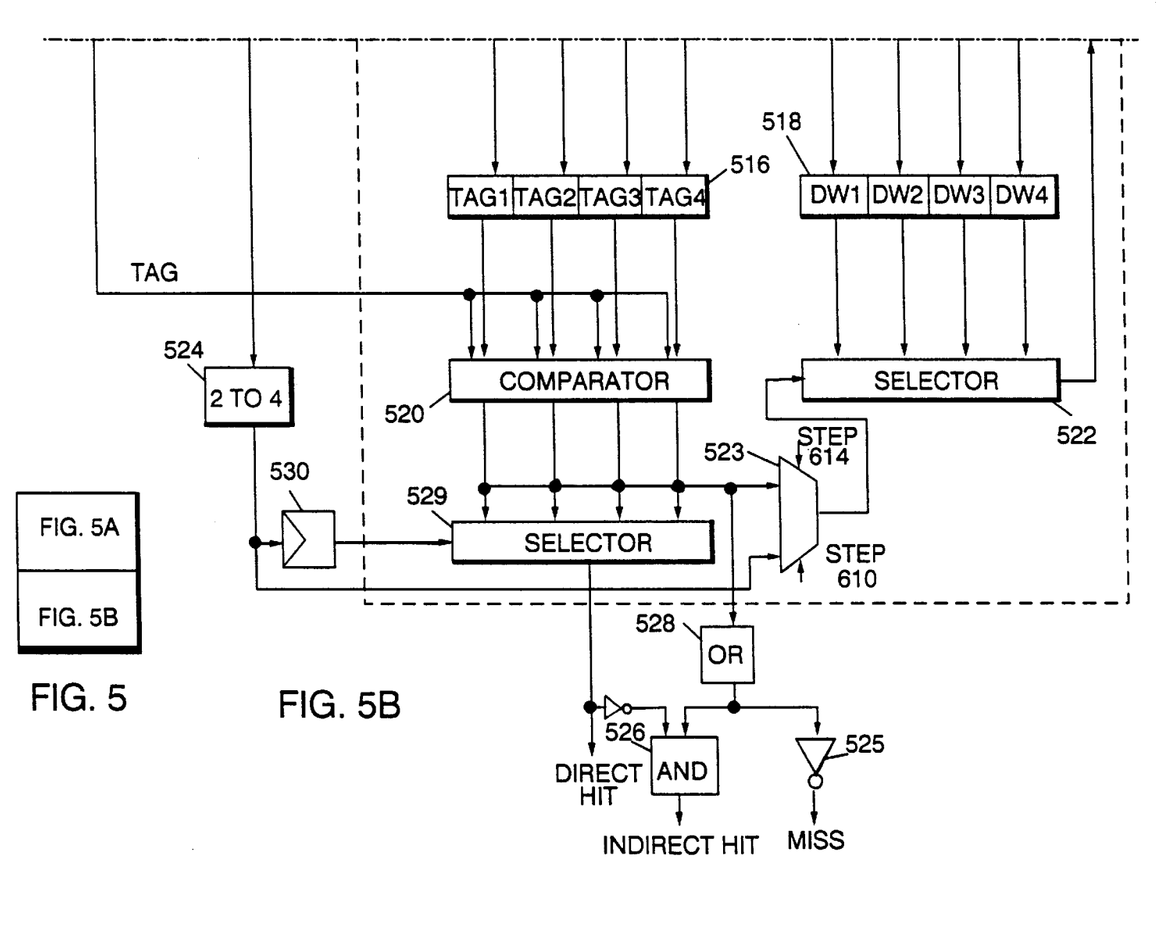
Figure 5A:
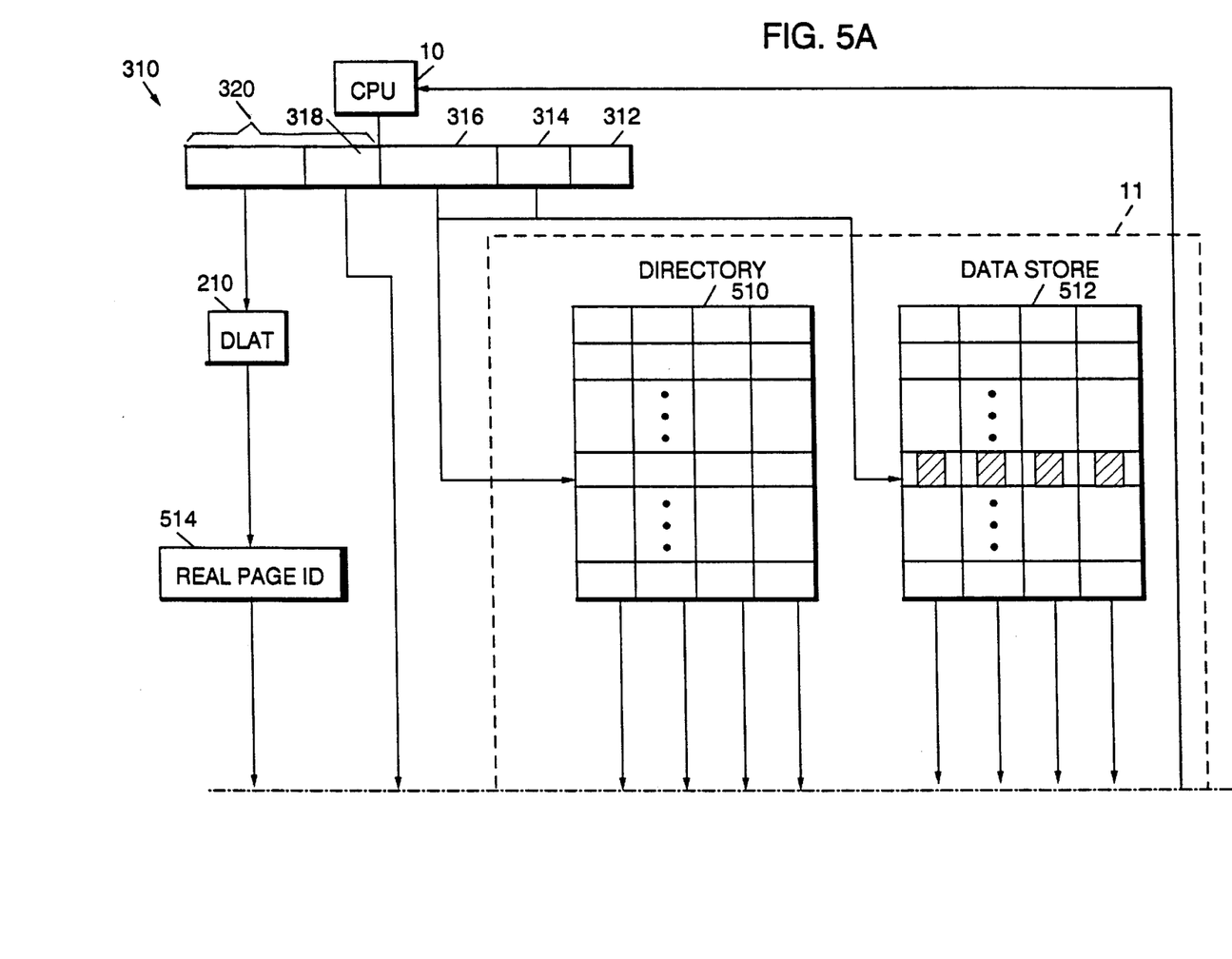

The functional block/data flow diagram of FIG. 5 shows the logical hardware components associated with cache 11. As shown by FIG. 5, CPU 10 sends a memory address 310 to DLAT 210 and cache 11. DLAT 210 translates a virtual address into real page ID 514, which is then sent to cache 11.

Cache 11 comprises two main sections: directory 510 and data store 512. Directory 510 contains the tags 320 of each line in cache 11. Each CC has four sets and each set contains the tag of a line. Data store 512 contains the DWs corresponding to each line in cache 11. The DWs are also arranged by CC and set, with each set having eight (8) DWs.

Both directory 510 and data store 512 have associated buffers 516, 518 for storing selected tags and data respectively. Directory 510 has a comparator 520 for testing the contents of buffer 516. Similarly, data store 512 has a selector 522 for selecting a DW in its buffer 518.

To access data from cache 11, CPU 10 sends a memory address 310 to cache 11. Tag 320 of memory address 310 is sent to DLAT 210. DLAT 210 converts the tag 320 into a real address and sends the tag portion of that address to comparator 520. The comparators 520 compare the tags from each CC selected by CC ID 316 (see FIG. 3) to the tag from 514. One of the comparator outputs will be TRUE if the corresponding tag matches. The four outputs from the comparator are used as select lines to select the double word of the matched set in the conventional set-associative lookup mode. The set ID portion 318 of the address is sent to a 2-to-4 decoder 524 and the output of the decoder is used as data input to selector 529 through delay circuit 530 and to selector 523.

In the improved cache, either the comparator output or the 2-to-4 decoder 524 output is used to select one of the DWs out of the congruence class. In the direct lookup mode, the output from the decoder 524 is used (enabled by select input step 610). In the set-associative lookup mode, the output from the comparator 520 is used (enabled by select input step 614).

The decoded set ID 318 from decoder 524 is also used as the select input to selector 529. The output of selector 529 corresponds to the comparator output of the set specified by set ID 318. In the direct lookup mode, if the output of selector 529 is true, the direct lookup is a hit. Since the comparator result is slower to produce, we assume that the delay 530 is necessary to synchronize the select line input to selector 529 with the result of the comparator outputs. If a true compare is indicated by an output of comparator 520, and selector 529 output is false, an indirect hit is indicated at the output of AND 526. If no true compare is indicated by a false output of comparator 520, a miss is indicated at the output of inverter 525.

CC ID 316 is sent to cache directory 510. The four tags corresponding to the four sets within the CC referenced by CC ID 316 are loaded into buffer 516. Similarly, CC ID 316 and DW ID 314 are sent to data store 512. The four DWs addressed by DW ID 314 within the CC are loaded into buffer 518.

Figure 6:
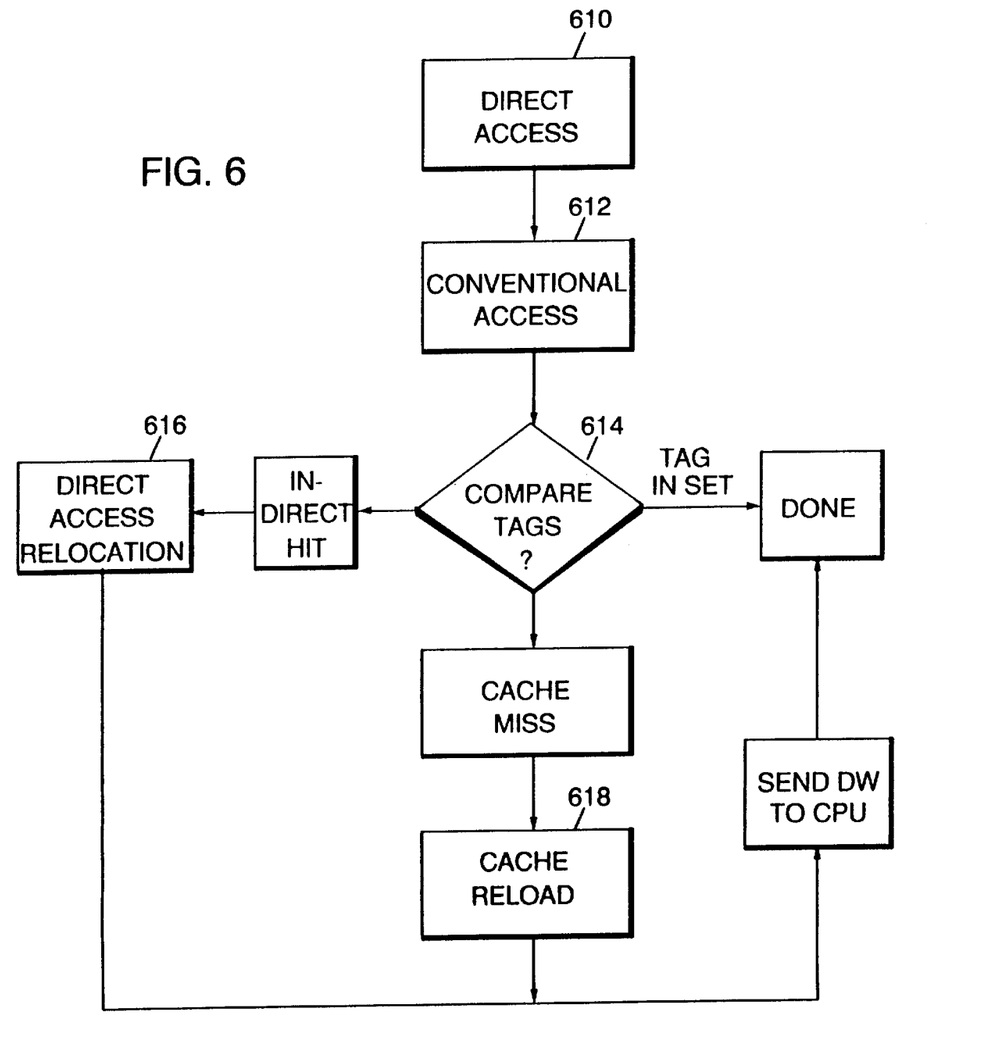
FIG. 6 is a flow chart showing the logical steps performed by a cache embodying the present invention.

FIG. 6 shows the operation of the DASA cache 11 of the present invention using the hardware of FIG. 5. In general, the operation of DASA cache 11 when retrieving data comprises two accesses and, if necessary, one of two types of line relocation.

When a memory address 310 is first received by L1 cache 11, a direct lookup is performed (step 610). That is, CC ID 316 is sent to directory 510 and the four tags of the lines in the congruence class are loaded into buffer 516. In addition, CC ID 316 and DW ID 314 are sent to data store 512 and the corresponding DWs are loaded into buffer 518. Then, set ID 318 are decoded and used as select input to selector 522 to select the DW from buffer 518. The selected DW is sent to CPU 10.

As the comparator result is ready, step 612 comes into operation. The comparators 520 carry out the comparisons with the tag 320 in the memory address 310 to the tags in the congruence class for the conventional 4-way set associative lookup. The comparisons are carried out while the direct lookup mode is selecting the DW using the decoded set ID 318.

When the comparator result is ready (step 614), the outcome of the direct lookup is determined. If the selector 529 output is true, the direct lookup was a hit, and the CPU should use the DW produced by the direct lookup. If, instead, the AND gate 526 output is true, there is an indirect hit, meaning that a tag other than the one specified by set ID 318 matches the translated tag 320. In the case of an indirect hit, the cache cancels the DW sent to the CPU and supplies the DW in the matching line. (Note that this mechanism may take two cycles because of the delay in generating and sending the comparator output to the data store.) If the inverter 525 is true, there is a cache miss. These are evaluated at step 614.

Figure 7:
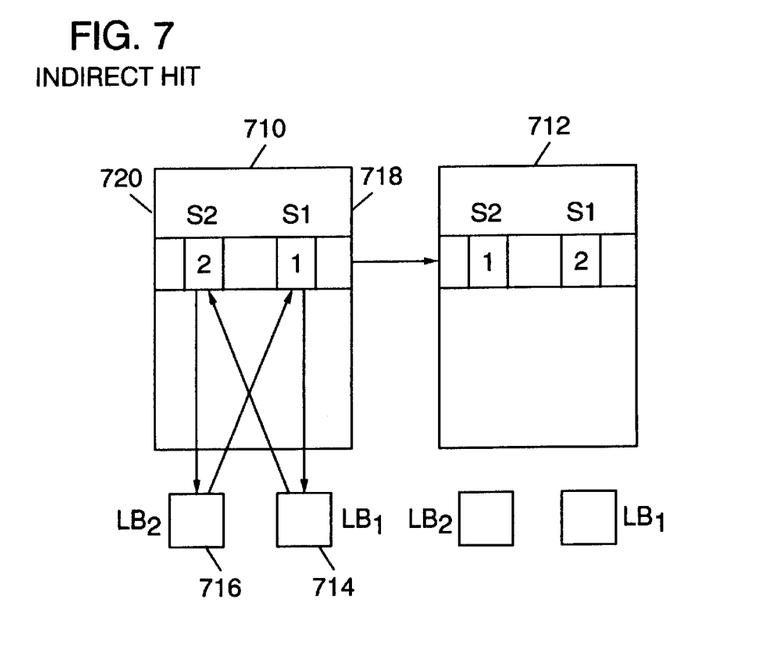
FIG. 7 describes the actions performed when the cache performs a direct access relocation.

When an indirect hit occurs, the line identified by tag 320 is relocated from its present set into the set identified by its set ID 318. This relocation is called "direct access relocation" and is shown in FIG. 7. Shown are two configurations 710, 712 of lines within cache L1, two line buffers ("LBs") 714, 716, and two sets 718, 720. Set 718 contains line 1, designated $l_1$, while set 720 contains line 2, designated $l_2$. Line 1 is the line identified by memory address 310. The LBs 714, 716 are registers built into cache 11.

To perform the relocation, line 1 is placed in LB 714 and line 2 is placed in LB 716. Then, set 718 is loaded from LB 716 and set 720 is loaded from LB 714. Configuration 712 shows the contents of cache 11 after performing the relocation.

If no line in the CC has a tag that matches the tag received from DLAT 210, then the DW sent to the processor is canceled and a "cache miss" signal is sent to L2 cache 13. L2 cache 13 will then reload the line into L1 cache 11 (step 618). Once the line has been loaded, L1 cache 11 sends the DW to the central processing unit 10.

Figure 8:
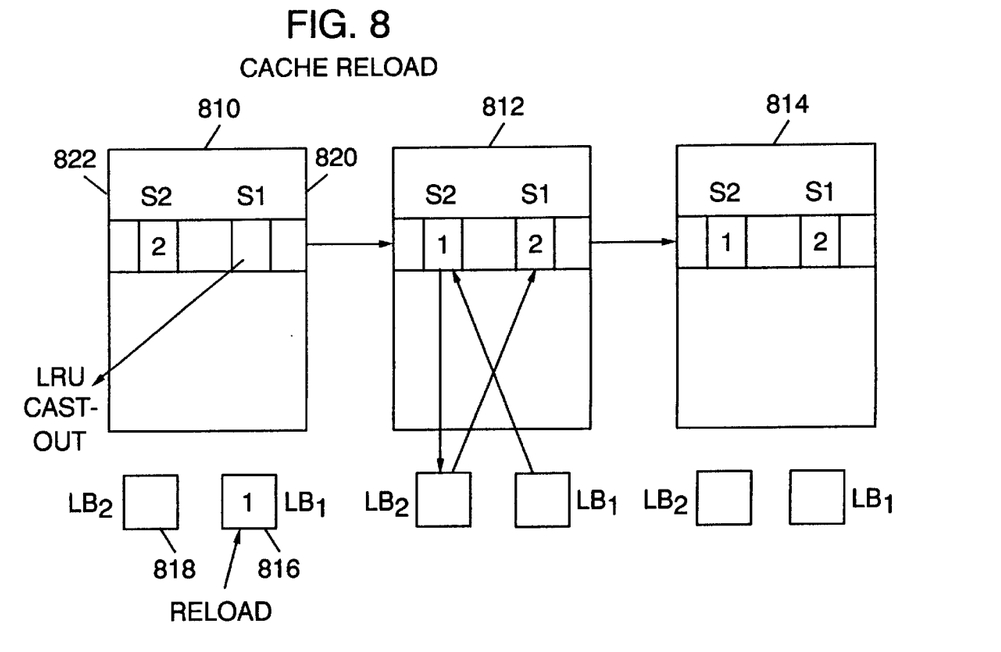
FIG. 8 describes the actions performed when the cache performs a cache reload.

The cache reload is shown in FIG. 8. Shown are three configurations 810–814 of lines within cache 11. Each configuration has two LBs 816, 818 and two sets 820, 822. In configuration 810, LB 816 contains line 1, designated $l_1$, while set 822 contains line 2, designated $l_2$. Set 822 is the set identified by the set ID 318 received from DLAT 210. Set 820 is the least recently used ("LRU") line within the CC. Line 1 is the line identified by memory address 310.

To perform the cache reload, the LRU line in set 820 is cast out of the cache, as is shown in configuration 810. Next, as shown in configuration 812, line 2 is placed in LB 818. Then, line 1 is loaded into set 822 from LB 816. In addition, line 2 is loaded into set 820 from LB 818. Configuration 814 shows the contents of sets 820 and 822 after the reload is performed. In configuration 814, the line requested by the memory address is stored in the set matching its set ID, while the previous contents of that set are stored in the former LRU set.

As shown above, there is some complexity involved in the cache when there is an indirect access or a cache miss. A relocation takes at least two cycles to complete and could hold up the cache (or, more precisely, the congruence class involved) for the duration of the relocation. Depending on the requirements for a particular cache, fast relocation or, more preferably, a dual ported cache may be needed.

Due to the way the address bits of CC ID 316 and set ID 318 are used in the DASA cache of the present invention, the DASA hit ratio is exactly equal to the hit ratio of a conventional direct-mapped cache of the same capacity and line size. Logically following from the above is that the chance that an access hits in the DASA cache and takes only one cycle is the same as the hit ratio of an equivalent direct-mapped cache. In addition, the chance that an access hits the cache and takes about two cycles is the difference of the hit ratios between a set associative cache and a direct-mapped cache. Furthermore, the overall cache hit ratio of a DASA cache is the same as that of a set associative cache.

Although the present invention and its advantages have been described in detail, it should be understood that various changes, substitutions and alterations can be made herein without departing from the spirit and scope of the invention as defined by the appended claims.

What is claimed is:

1. An information handling system, comprising:
   a processing unit; and
   a hierarchical memory system comprising:
   a relatively slow speed random access main memory; and
   at least two high speed cache memories, of which at least one is a first level cache having a set associative architecture including:
   (a) means for performing a direct lookup of a requested address to select a first data word, wherein said means for performing a direct lookup includes (i) means for accessing a cache line via a cache directory using a congruence class ID field in the requested address, wherein the cache line contains one or more tag fields stored in a buffer, (ii) means for accessing one or more data words from a data store using the congruence class ID field and a data word ID field in the requested address, and (iii) means for selecting, controlled via a selector and a decoded first ID field, one of the one or more data words accessed from the data store;

(b) means for sending the first selected data word to the processing unit; and (c) means for determining if the first selected data word is a correct data word to be used by the processing unit, wherein said means for determining if the first selected data word is the correct data word to be used by the processing unit includes (i) means for translating one or more bits from the requested address into a real page ID, wherein the real page ID includes a requested address tag, (ii) means for comparing the one or more tag fields from the cache line to the requested address tag, wherein the result of each comparison is either true or false, (iii) means for selecting, controlled via a second selector and the decoded first ID field, one of the results generated by the means for comparing, and (iv) means for determining if a direct hit, an indirect hit, or an access miss occurs utilizing the result output from the means for selecting one of the results generated by the means for comparing and outputs from the means for comparing;

further comprising:

means for canceling the first selected data word sent to said processing unit upon an occurrence of either an indirect access or an access miss; and means for selecting a second data word to send to said processing unit including (i) means for performing a direct access relocation upon the occurrence of an indirect access and (ii) means for reloading the cache line in said first cache with a new line from a second cache upon the occurrence of an access miss.

2. A method for accessing data in a hierarchical memory system comprised of a relatively slow speed random access main memory and at least two high speed cache memories, of which at least one is a first level cache having a set associative architecture, said method comprising the steps of:

performing a direct lookup of a requested address to select a first data word, including the steps of (i) accessing a cache line via a cache directory using a congruence class ID field in a requested address, wherein the cache line contains one or more tag fields, (ii) accessing one or more data words from a data store using the congruence class ID field and a data word ID field in the requested address, and (iii) selecting, controlled via a selector and a decoded first ID field, one of the one or more data words accessed from the data store;

sending the first selected data word to a processing unit; and determining if the first selected data word is a correct data word to be used by the processing unit, including the steps of (i) translating one or more bits from the requested address into a real page ID, the real page ID including a requested address tag, (ii) comparing the one or more tag fields from the cache line to the requested address tag, wherein the result of each comparison is either true or false, (iii) selecting, controlled via a second selector and the decoded first ID field, one of the results generated by the means for comparing, and (iv) determining if a direct hit, an indirect hit, or an access miss occurs utilizing the result of the step of selecting one of the results generated by the step of comparing and a result of the step of comparing;

further comprising the steps of:

canceling the first data word sent to said processing unit upon an occurrence of either an indirect access or an access miss; and selecting a second data word to send to said processing unit including (i) the step of performing a direct access relocation upon the occurrence of an indirect access and (ii) the step of reloading the cache line in said first cache with a new line from a second cache upon the occurrence of an access miss.

* * * * *